United States Patent [19]

Platteter et al.

[11] Patent Number: 5,093,915

[45] Date of Patent: Mar. 3, 1992

[54] METHOD FOR SELECTIVELY LOADING BOOTABLE FIBER TO CONTROL APPARATUS BASED UPON THE CORRESPONDING BOOTABLE ATTRIBUTES

[75] Inventors: Dale T. Platteter, Fairport; Robert S. Westfall, Rochester; Jeff C. Carter, Fairport, all of N.Y.

[73] Assignee: Xerox Corporation, Stamford, Conn.

[21] Appl. No.: 264,771

[22] Filed: Nov. 2, 1988

[51] Int. Cl.$^5$ ............... G06F 9/24; G06F 9/445; G06F 13/00; G06F 15/62

[52] U.S. Cl. ..................... 395/700; 364/235; 364/237.9; 364/260; 364/280.2; 364/962; 364/975.1; 364/DIG. 1

[58] Field of Search ......... 364/521, 554, 518, 724.19, 364/522, 200 MS File, 900 MS File; 369/32, 52; 358/140, 457, 135, 427, 449, 426; 355/67, 205, 14, 313, 325, 209; 340/709, 730, 825.23

[56] References Cited

U.S. PATENT DOCUMENTS

| | | | |
|---|---|---|---|
| 4,430,704 | 2/1984 | Page et al. | 364/200 |
| 4,626,986 | 12/1986 | Mori | 364/200 |
| 4,711,560 | 12/1987 | Hosaka et al. | 355/14 |
| 4,720,812 | 1/1988 | Kao et al. | 364/900 |
| 4,811,315 | 3/1989 | Inazawa | 369/32 |
| 4,821,251 | 4/1989 | Hosoya | 369/32 |
| 4,827,462 | 5/1989 | Flannagan et al. | 369/32 |
| 4,833,663 | 5/1989 | Satoh et al. | 369/32 |
| 4,884,220 | 11/1989 | Dawson et al. | 364/518 |
| 4,897,735 | 1/1990 | Oneda | 358/449 |
| 4,926,373 | 5/1990 | Takenaka | 364/900 |

OTHER PUBLICATIONS

John Angermeyer et al, "MS-DOS Developer's Guide", pp. 74, 76, 121, 122, 131, 181, 182, 192-193, 195-199, 201, 290-292, 356, 363, Howard W. Sam & Co., U.S.A., 1986.

Primary Examiner—Thomas C. Lee
Assistant Examiner—Ayni Mohamed
Attorney, Agent, or Firm—Ronald F. Chapuran

[57] ABSTRACT

A method of controlling an image processing apparatus having an image processing means for forming an image, a controller including a first memory, and a removable memory medium having a boot sector, a directory, and identifiable files with header sectors, selected files of the removable memory medium capable of being booted into said first memory for controlling the image processing means, including the steps of loading the removable memory medium into a memory drive integral with said image processing apparatus, reading the directory of the removable memory medium for determining bootable attributes, determining the validity of the header sector and the validity of files for booting into the controller, transferring all valid files of the removable memory into the first memory, and determining that the files loaded into the first memory are capable of controlling the image processing apparatus.

1 Claim, 7 Drawing Sheets

METHOD FOR SELECTIVELY LOADING BOOTABLE FIBER TO CONTROL APPARATUS BASED UPON THE CORRESPONDING BOOTABLE ATTRIBUTES

BACKGROUND OF THE INVENTION

The invention relates to a system for controlling a reproduction machine, and more particularly, to a bootable control for such reproduction machines.

As reproduction machines such as copiers and printers become more complex and versatile in the jobs they can do, the interface between the machine and the machine control must necessarily be expanded if full and efficient utilization of the machine is to be realized. A suitable interface must not only provide the controls, displays, and messages necessary to activate, program, monitor, and maintain the machine, but must allow for both flexible and alternate means for transferring and changing the machine system control software, including the means to boot the system control software from non-resident memory to the machine random access memory.

The prior art is replete with user interface systems. For example, the Xerox 5700 Electronic Printing System incorporates a touch control CRT screen providing button, key, and window images on the screen combined with text to give concise instructions to the operator. This system accepts magnetic cards, cassettes, and disks that store the documents to be printed and also the magnetic media can store control information to specify the output format for printing or to invoke special features such as merging or interleaving. The system software translates the coded data, formats the page, and generates the hard copy locally, or the system can transmit the data via a communication link to remote 5700 printing sites.

U.S. Pat. No. 4,711,560 discloses a copier which functions according to a sequence control program stored on floppy disk and loaded by a user. The floppy disk can also contain a diagnostic program to facilitate maintenance, and further act as a key to prevent unauthorized use of the copier. U.S. Pat. No. 4,742,483 discloses a laser printer including a microprocessor to read data or program information from a cartridge loaded by a user. A special maintenance operating system on the cartridge runs the printer through automatic routines to be checked by a technician.

In addition, U.S. Pat. No. 4,590,557 discloses a method for controlling software configurations. Portable media, such as a floppy disk, contain a bootstrap program for loading an operating system into the system. A second portable media contains a program for altering the software configuration of the system. U.S. Pat. No. 4,186,299 to discloses a reproduction mechine with a programmable computer capable of operating various machine components. Memory in the computer contains a plurality of different operating programs. Diagnostic programs are accessible through the operator console. U.S. Pat. No. 4,480,329 to Grodebeke discloses a controller in a copier system that contains several diagnostic procedures in memory. A set of switches select either normal operating mode or diagnostic mode.

A difficulty with the prior art reproduction machine systems is the inability to load selected sysem software bootable files from a nonresident memory to the system random access memory. It would be desirable in a reproduction machine to be able to add additional system software and functions without the need to change any hardware in the system and to be able to selectively scan a floppy disk for bootable attributes and boot selected files into RAM. It is an object, therefore, of the present invention to provide a new an improved technique for loading and executing non-resident software controls in a reproduction machine. Further advantages of the present invention will become apparent as the following description proceeds, and the features characterizing the invention will be pointed out with particularity in the claims annexed to and forming a part of this specification.

SUMMARY OF THE INVENTION

Briefly, the present invention is concerned with the method of controlling an image processing apparatus having an image processing means for forming an image, a controller including a first memory, and a removable memory medium having a header sector and identifiable files, selected files of the removable memory medium capable of being booted into said first memory for controlling the image processing means, including the steps off loading the removable memory medium into a memory drive integral with said image processing apparatus, scanning the removable memory medium for bootable attributes, determining the validity of the header sector and the validity of files for booting into the controller, transferring all valid files of the removable memory into the first memory, and determining that the files loaded into the first memory are capable of controlling the image processing means to form images.

For a better understanding of the present invention, reference may be had to the accompanying drawings wherein the same reference numerals have been applied to like parts and wherein:

DETAILED DESCRIPTION OF THE DRAWINGS

DETAILED DESCRIPTION OF THE PREFERRED EMBODIMENT

Figure 1:
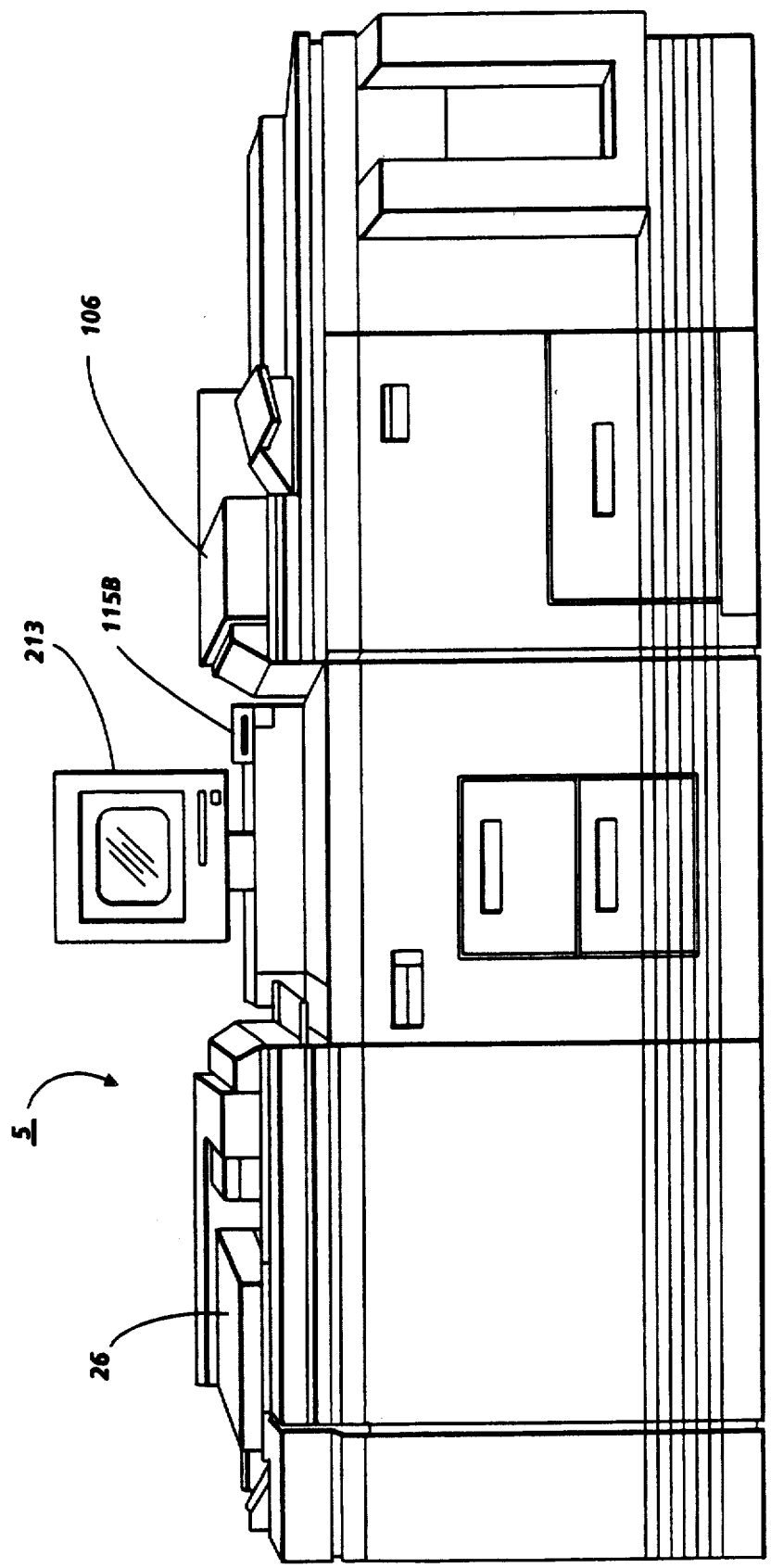
FIG. 1 is an isometric view of an illustrative reproduction machine incorporating the touch dialogue User Interface (U.I.) of the present invention.
Figure 2:
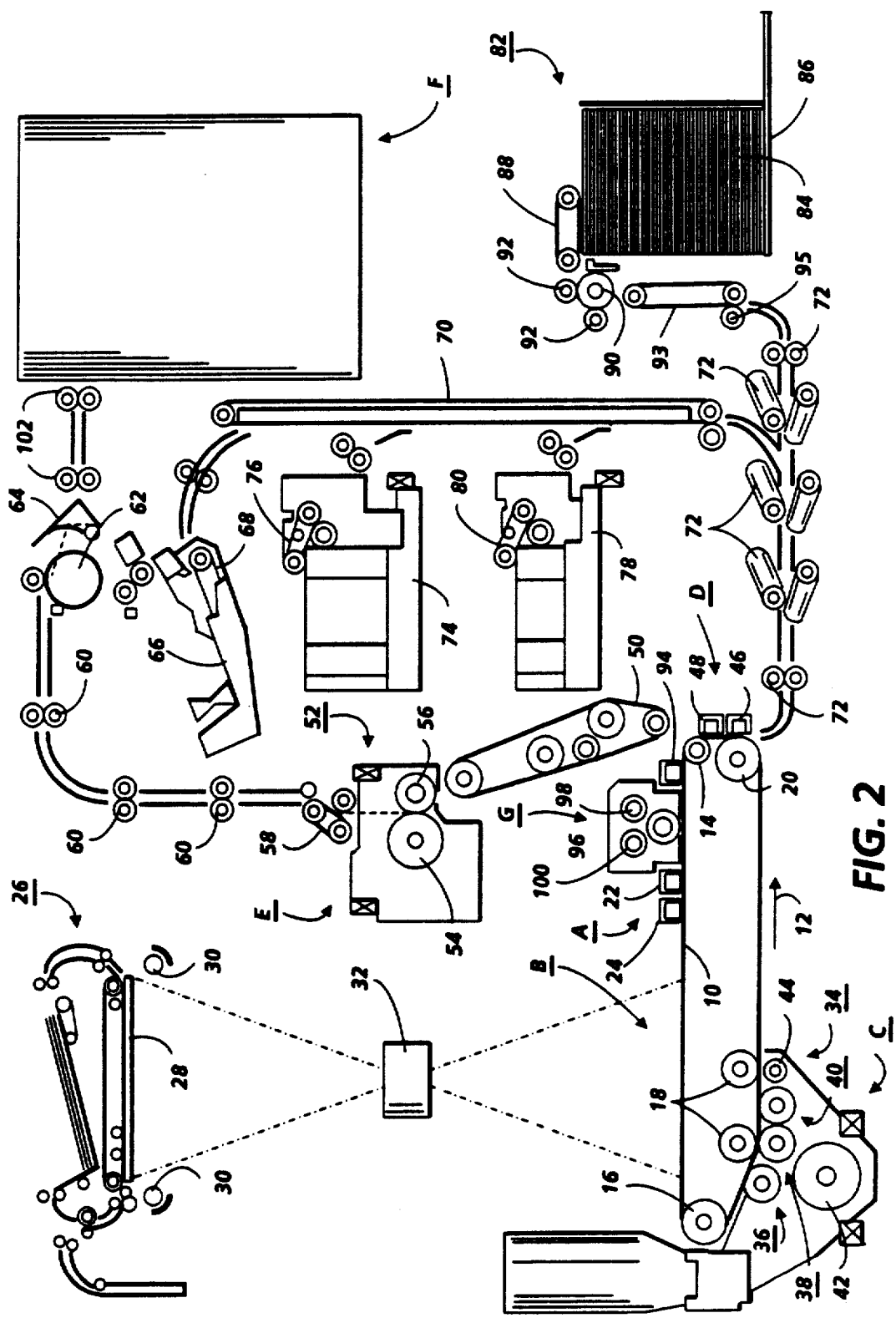
FIG. 2 is a schematic elevational view depicting various operating components and sub-systems of the machine shown in FIG. 1.
Figure 3:
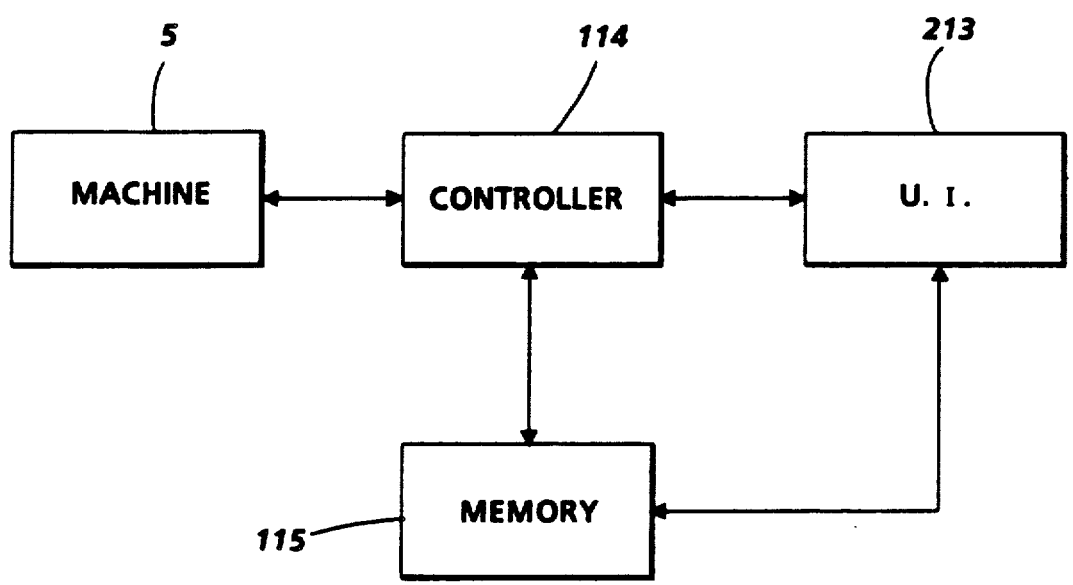
FIG. 3 is a block diagram of the operating control systems and memory for the machine shown in FIG. 1.

For a general understanding of the features of the present invention, reference is made to the drawings. In the drawings, like reference numerals have been used throughout to identify identical elements. Referring to FIGS. 1, 2, and 3, there is shown an electrophotographic reproduction machine 5 composed of a plurality of programmable components and sub-systems which cooperate to carry out the copying or printing job programmed through the touch dialogue User Interface (U.I.) of the present invention. It will become evident from the following discussion that the touch dialogue U.I. of the present invention may be employed in a wide variety of devices and is not specifically limited in its application to the particular embodiment depicted herein.

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advanced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a lamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detach the copy sheet from belt 10.

Following transfer, a conveyor 50 advances the copy sheet bearing the transferred image to fusing station E where a fuser assembly, indicated generally by the reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station D.

After transfer station D, photoconductive belt 10 passes beneath corona generating device 94 which charges any residual toner particles remaining on belt 10 to the proper polarity. Thereafter, a precharge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

With reference to FIG. 3, the various functions of machine 5 are regulated by a controller 114 which preferably comprises one or more programmable microprocessors. The controller provides a comparison count of the copy sheets, the number of documents being recirculated, the number of copy sheets selected by the operator, time delays, and jam corrections. Programming and operating control over machine 5 is accomplished through a U.I. 213. Operating and control information is stored in a suitable memory 115 and loaded into controller 114 and job programming instructions are loaded into the controller 114 through U.I. (User Interface) 213. Conventional sheet path sensors or switches may be utilized to keep track of the position of the documents and the copy sheets. In addition, the controller regulates the various positions of the gates depending upon the mode of operation selected.

Figure 4:
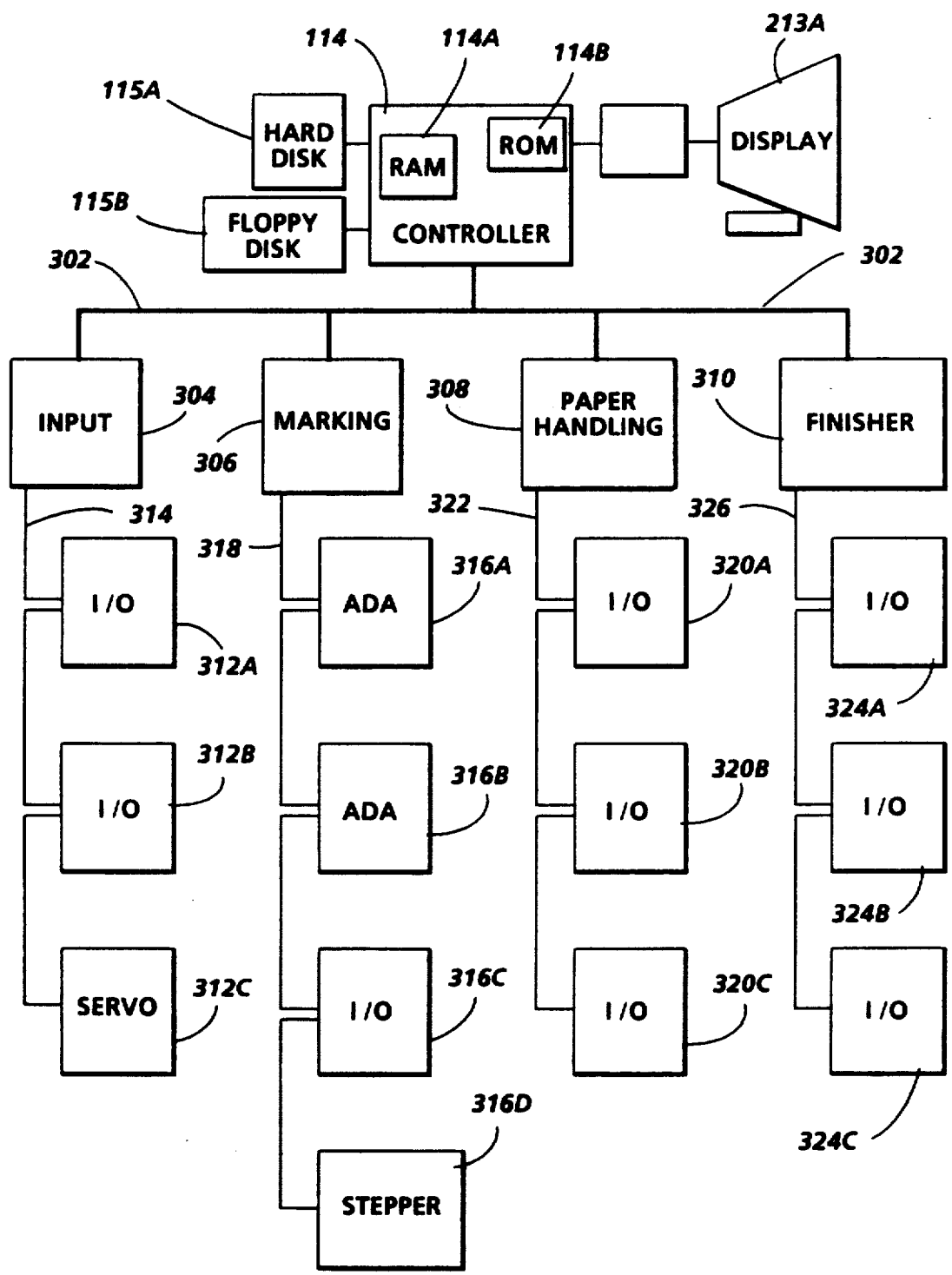
FIG. 4 is a more detailed block diagram of the operating control system of FIG. 3.

With reference to FIG. 4, memory 115 includes a hard or rigid disk drive 115A for receiving suitable rigid memory disks and a floppy disk drive 115B for receiving suitable floppy memory disks, both disk drives being electrically connected to Controller 114, the Controller 114 including RAM 114A and ROM 114B. In a preferred embodiment, the rigid disks are two platter, four head disks with a formatted storage capacity of approximately 20 megabytes. The floppy disks are 3.5 inch, dual sided micro disks with a formatted storage capacity of approximately 720 kilobytes. In normal machine operation, all of the control code and screen display information for the machine is loaded from the rigid disk at machine power up. Changing the data that gets loaded into the machine for execution can be done by exchanging the rigid disk in the machine 5 for another rigid disk with a different version of data. In accordance with the present invention, however, all of the control code and screen display information for the machine can be loaded from a floppy disk at machine power up using the floppy disk drive built into the machine 5. Suitable display 213A of U.I. 213 is also connected to Controller 114 as well as a shared line system bus 302.

The shared line system bus 302 interconnects a plurality of core printed wiring boards including an input station board 304, a marking imaging board 306, a paper handling board 308, and a finisher/binder board 310. Each of the core printed wiring boards is connected to local input/output devices through a local bus. For example, the input station board 304 is connected to digital input/output boards 312A and 312B and servo board 312C via local bus 314. The marking imaging board 306 is connected to analog/digital/analog boards 316A, 316B, digital input/output board 316C, and stepper control board 316D through local bus 318. In a similar manner, the paper handling board 308 connects digital input/output boards 320A, B and C to local bus 322, and finisher/binder board 310 connects digital input/output boards 324A, B and C to local bus 326.

Figure 5:
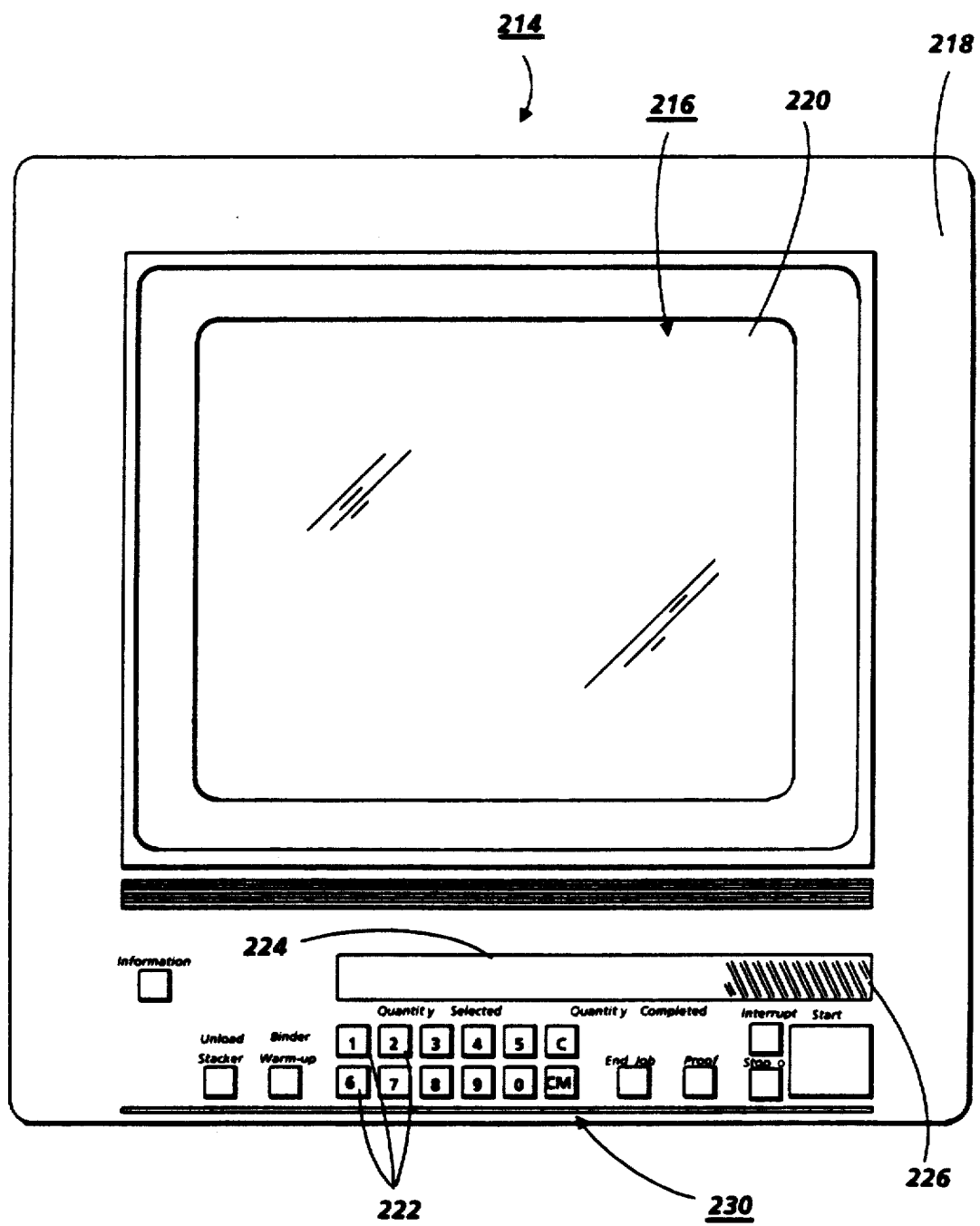
FIG. 5 is a front view of the U.I. color touch monitor showing the soft button display screen and hard button control panel.

Referring to FIG. 5, there is shown the color touch monitor 214 for the touch dialogue U.I. 213. Monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0-9" buttons providing a keypad 230 for programming copy quantity, code numbers, etc.; a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up of binder 126; an "Interrupt" button to initiate a job interrupt; a "Proof" button to initiate making of a proof copy; an "End Job" button to end the current job; and an "i" button to initiate a request for information. For further details of the control, reference may be had to U.S. Ser. No. 07/164,365 filed Mar. 4, 1988, and incorporated herein.

Figures 6, 7:
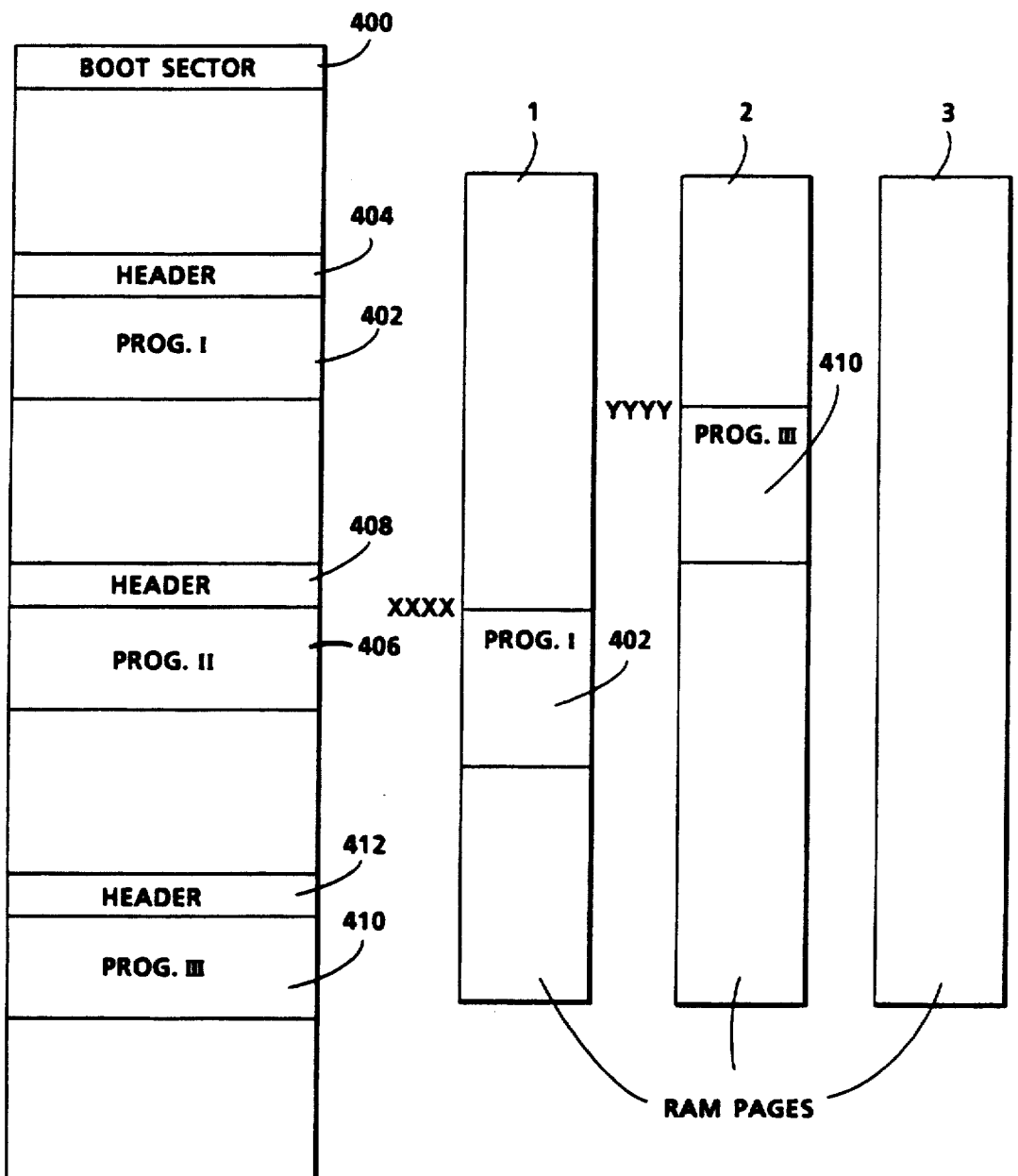
FIG. 6 is an illustration of floppy disk memory allocaation in accordance with the present invention.
FIG. 7 is an illustration of RAM page memory allocation in accordance with the present invention.

In accordance with the present invention, a floppy disk is loaded into the floppy disk drive 115B. With reference to FIG. 6, there is an illustration of the memory allocation on a floppy disk loaded into the floppy disk drive 115B. A header sector or boot sector 400 is allocated to the location of that portion of the floppy disk that is initially read. A plurality of programs or code segments are also allocated on the floppy disk as illustrated by program I-402 with its header sector 404, program II-406 with its header sector 408, and Program III-410 with its header 412. The header sectors 404, 408 and 412 contain information concerning where to load the file in RAM 114A and at what page in memory to load, if it is booted.

Typically, the random access memory is segmented into a plurality of RAM pages, as illustrated in FIG. 7, and the read in code is located or stored at a specific location on a specific RAM page. By way of illustration, Program I-402 from the floppy disk is illustrated as being stored in RAM page 1 beginning at the address XXXX and Program III-410 from the floppy disk is illustrated as being allocated to the RAM page 2 beginning at address YYYY. It should be noted that Program II-406 on the floppy disk is assumed to be a program that is indicated in the header 408 not to be booted into RAM 114A.

It should also be noted that even though various portions of systems software to operate the reproduction machine are being loaded from the floppy disk onto the RAM 114A of controller 114, it is necessary to have a small portion of the systems software residing in the controller 114 as illustrated by ROM 114B in FIG. 4. Thus, when the machine is initially turned on, the portion of systems software in ROM 114B initiates the operation of the controller 114 to initiate the first necessary booting operations, i.e. the systems control residing in ROM 114B at start-up begins the operation of the floppy disk drive, and reads at least the initial boot sector 400 on the outer edge of a floppy disk.

The boot sector 400 also known as the boot record generally resides as the very first sector on the disk. This boot sector contains the information about the disk, specifically, the logic of how to load bootable files. On the other hand, a file directory contains information identifying which files on the disk are to be booted from the disk to RAM, and a file header for each file contains the location in RAM where the file is to be loaded. That is, the boot sector contains the minimal amount of code, called a boot loader, required to search the floppy disk directory for those files that are directly loadable into RAM and instructs the boot ROM 114B to load these particular files into designated memory locations or segments in RAM 114A identified by the file header. At the completion of loading all the directly loadable files, the boot sector 400 then instructs the boot ROM 114B to verify that all the segments loaded into RAM are a functional system. That is, the boot sector instructs the boot ROM 114B to determine that the programs and code that have been loaded into RAM are sufficient to be able to control and operate the machine 15. If the loaded software or system is valid as determined by the pattern file checksum routine, the boot ROM 114B then starts the system operating by jumping to a fixed address.

The file programs I and III as illustrated at 402 and 410 which are to be boot loaded into RAM consist of two parts. The first part is the header record 404 and 412 which tells the boot loader 114B where the files are to be loaded into memory. The second part is an actual binary memory image. The data is read from the floppy disk in 512 byte sectors. The header sector 404, 412 consists of a 512 byte (1 sector) data block which contains a multiple byte pattern, the size of the file in sectors, and a page and address of where the file is to be loaded into memory. The remaining 498 bytes of data can be used to contain file configuration information.

Figure 8:
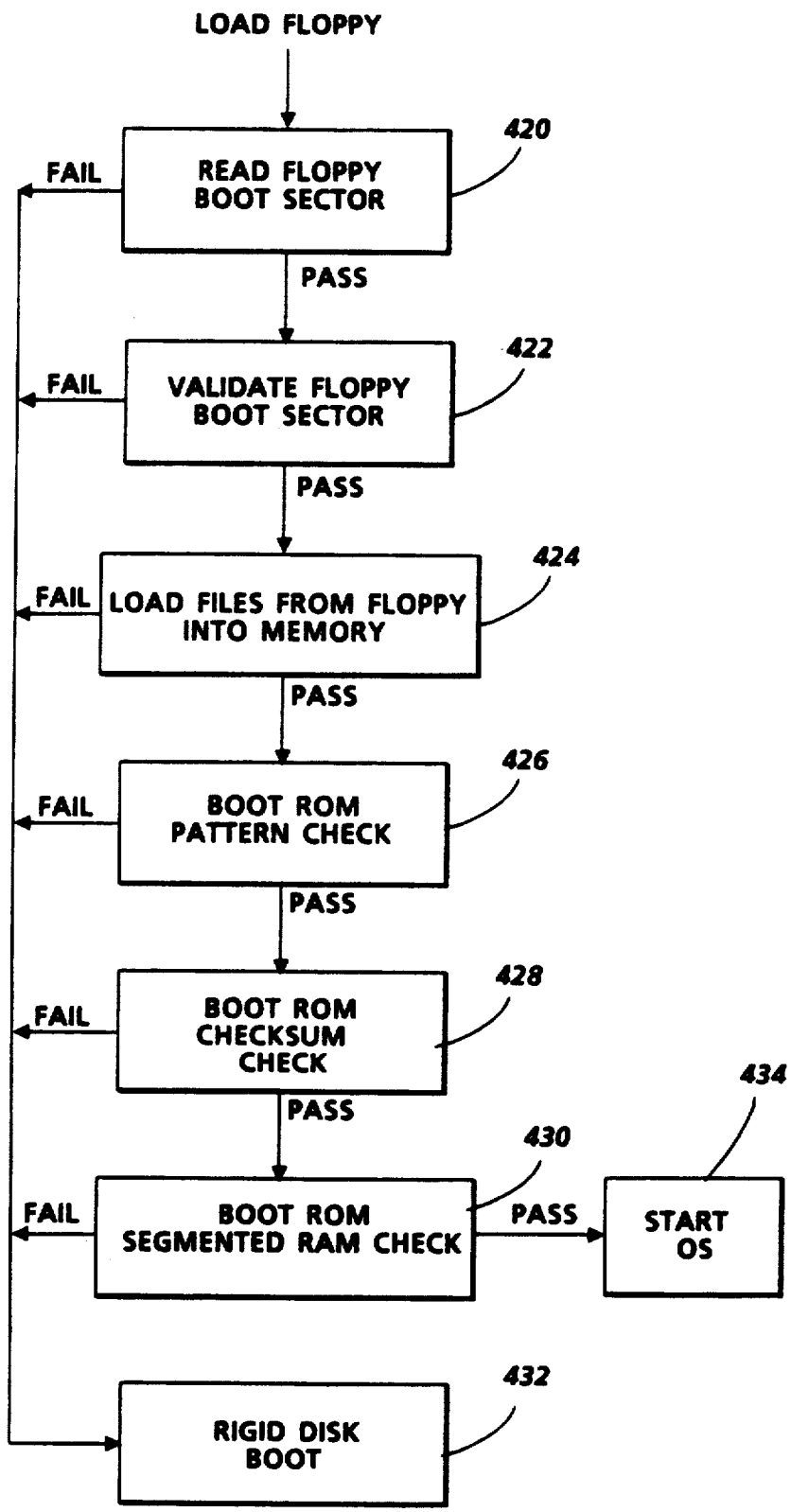
FIG. 8 is a flow chart illustrating the bootable sequence in accordance with the present invention.

In operation, with reference to FIG. 8, the boot ROM 114B of the machine initially searches for a floppy disk in the floppy disk drive 115B before attempting to boot from the rigid disk drive 115A. If a bootable floppy disk is not found in the disk drive 115B, the boot ROM will boot from the rigid disk drive 115A and commence operation as shown at 432. However, if the boot ROM 114B locates a floppy disk in the disk drive 115B, it reads the boot sector 400 (FIG. 6) into RAM 114A. If unable to read the first sector of the floppy (boot sector), the controller will boot from the rigid disk drive. If it was able to read the boot sector residing on that particular floppy disk, the boot ROM 114B will then determine if the boot sector 400 is a valid boot sector as shown at 422. If not, the boot ROM 114B will again return to the hard disk drive 115A to boot the system code into RAM 114A.

However, if the boot sector 400 is valid, the boot ROM will then read the floppy disk directory (containing the attributes of each file on the floppy disk) to locate those particular files that are bootable files. This is determined by scanning a floppy directory containing the bootable defining attributes and location of files and scanning the header sector of each of the files, for example, the header sector 404 of file 402. The bootable files are then loaded into RAM shown at 424 and a final check is made by the boot ROM 114B to determine if the bootable files that have been loaded into RAM are valid to operate the system. These checks are the pattern check, checksum check, and segmented RAM check illustrated at 426, 428, and 430. Again, if not valid, the boot ROM will boot from the rigid disk drive 115A. If the system is valid for operation, the boot ROM 114B will start the system running by jumping to the operating system OS at a fixed address in the RAM memory as shown at 434.

Thus, the User Interface UI boot ROM download is defaulted to the floppy drive if a floppy is in the drive. Otherwise, the boot ROM downloads from the rigid disk. Specifically, on floppy download, the boot ROM reads the boot loader, performs a pattern check to validate the boot loader, and then does a series of calls to the boot loader. Download is completed when the boot loader indicates there are no more files to load. If any failures occur while reading from the floppy, the boot ROM will attempt to boot from the rigid disk.

In a preferred embodiment the boot ROM reads the first sector (the boot loader) from the floppy disk, stores it at '5000' on page 0 in RAM and then verifies the pattern bytes ('A5', '5A' at location '51FE'). If the pattern is valid, the boot load process is started. The boot ROM performs the actual boot load process by making a series of calls to the boot loader. The boot loader routine is structured as a subroutine so that it does not have to know about the hardware, or about any implicit structure in the boot ROM. It simply determines which sectors on the floppy should be loaded and where they should be loaded. The Boot ROM is responsible for all of the hardware management tasks, for performing the actual data reads and for verifying that the boot load process has completed without errors.

The boot loader subroutine is completely contained within the boot record of the floppy. It is responsible for telling the boot ROM which sector to read off the floppy and where to write them in memory. The maximum number of directory entries that the loader subroutine will search is 112 entries or the maximum number of entries in the directory. The status passed to the subroutine will determine which several operations the loader subroutine will perform. The status passed to the subroutine is the same status value that was returned to be boot ROM from the previous call. A value of 0 must be used on the first call to force the subroutine to initialize it's memory. If the value is 0, then it will increment the value and return a request to read the disk directory into memory at a fixed location. If the MS bit of the status is zero, then it will search the directory starting at entry number (status-1) for a file which appears to be bootable. If it finds a file, then it will set the MS bit of the status, calculate the starting location of the file and return a request to read the header record into the loader's sector buffer. If it reaches the maximum number of entries, or an unused entry in the directory, then it will change the status to FF indicating that the boot load has been completed and will return to the boot ROM. If the MS bit of the status is one, then it will verify that a valid header record has been read into the subroutine's sector buffer. If a valid header record has been loaded, then it will determine the address of where the file is to be loaded into memory, clear the MS bit of the status, increment it and return a request to read the remaining sectors of the file into memory at the desired address.

Each file which is to be booted will contain a header record. The remaining data in the file is to be absolutely located binary data which can be directly written into memory and then executed. The header record as illustrated contains information about the file necessary for boot loader. This information includes a pattern to verify that this is indeed a bootable file, the starting page and address of where the data is to be stored in memory, and the length in sectors of the file. Additional information may be stored in the header record such as the original name of the file and the date the original file was written, and the date that the bootable file was created. This additional information could be in text format so that one could examine the header record and determine some additional information about the file.

| HEADER RECORD FORMAT | | |
|---|---|---|
| LOCATION | SIZE | USAGE |
| 0 | 2 bytes | Pattern X'A5",X'5A' |
| 2 | 1 byte | Destination Page |
| 3 | 1 word | Destination address |
| 5 | 1 byte | Length of file in sectors (including header) |
| 6 | 10 bytes | Reserved |
| 16 | 496 | Spare - usage not restricted |

In order for the boot loader to determine which files are to be loaded, and where they are to be loaded, the following information must be provided. The attributes byte in the floppy directory for the file must be set to Read Only, System and Archive. Each file to be loaded must be stored as contiguous sectors on the floppy. This can be done by writing the files which must be booted onto a freshly formatted disk with no bad blocks, and then writing any additional files onto the floppy. Each file must have a header record which supplies a testable pattern, and defines the load address of the file, the length of the file, and what ever other information you wish to add to the header.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. In an image processing apparatus having image processing means for forming an image, a controller including a first memory, and a removable memory medium having a header sector a boot sector and identifiable files with bootable attributes, selected files of the removable memory medium capable of being booted into said first memory for controlling the image processing means, the method of controlling the image processing apparatus comprising the steps of:

loading the removable memory medium into a memory drive integral with said image processing apparatus, reading the boot sector, reading the directory to determine by their attributes which files are bootable, reading the header sector of the removable memory medium for bootable attributes, determining the validity of the header sector and the validity of files for booting into the controller, transferring all valid files of the removable memory into the first memory, determining that the files loaded into the first memory are capable of controlling the image processing including the step of loading a pattern file into the first memory to perform a checksum verification, and loading additional files from the removable memory medium onto the first memory based upon said verification.

* * * * *